United States Patent
Wang (10) Patent No.: US 9,256,673 B2
(45) Date of Patent: Feb. 9, 2016

(54) METHODS AND SYSTEMS FOR IDENTIFYING CONTENT IN A DATA STREAM

(75) Inventor: Avery Li-Chun Wang, Palo Alto, CA (US)

(73) Assignee: Shazam Entertainment Ltd., London (GB)

( * ) Notice: Subject to any disclaimer, the term of this patent is extended or adjusted under 35 U.S.C. 154(b) by 133 days.

(21) Appl. No.: 13/488,083

(22) Filed: Jun. 4, 2012

(65) Prior Publication Data

US 2012/0317240 A1 Dec. 13, 2012

Related U.S. Application Data (60) Provisional application No. 61/495,571, filed on Jun. 10, 2011.

(51) Int. Cl.
- *G06F 15/16* (2006.01)
- *G06F 17/30* (2006.01)
- *H04H 60/37* (2008.01)

(52) U.S. Cl.
CPC ......... *G06F 17/30861* (2013.01); *H04H 60/37* (2013.01)

(58) Field of Classification Search
CPC .............. H04L 29/08072; H04L 29/06; H04L 29/0809; H04L 29/08981; H04L 29/08117; H04L 29/06027; H04L 29/06462; H04L 29/06523
USPC .......................................... 709/218–219, 231
See application file for complete search history.

(56) References Cited

U.S. PATENT DOCUMENTS

| | | |
|---|---|---|
| 4,450,531 A | 5/1984 | Kenyon et al. |
| 4,843,562 A | 6/1989 | Kenyon et al. |
| 5,134,719 A | 7/1992 | Mankovitz |

(Continued)

FOREIGN PATENT DOCUMENTS

| | | |
|---|---|---|
| JP | 2005-274992 A | 10/2005 |
| JP | 2006-146883 A | 6/2006 |
| WO | WO 2010/086739 | 8/2010 |

OTHER PUBLICATIONS

International Preliminary Report on Patentability and Written Opinion of the International Searching Authority prepared by WIPO in International Patent Application Serial No. PCT/US2012/040754, mailed Dec. 27, 2013.

(Continued)

*Primary Examiner* — Abdullahi E Salad
(74) *Attorney, Agent, or Firm* — McDonnell Boehnen Hulbert & Berghoff LLP (57) ABSTRACT

Methods and systems for identifying content in a data stream are provided. In one example, a client device receives a continuous data stream and substantially continuously performs a content identification of content in the data stream based on content patterns stored on the client device. The content patterns stored on the client device may include information associated with extracted features of a media file, or a temporally mapped collection of features describing a media file. The client device may determine whether the continuous data stream includes media content, and based on the determination, continuously perform the content identification of content in the data stream at the client device. The client device may query a server to determine an identity of content in the data stream based on receiving an instruction.

19 Claims, 4 Drawing Sheets

(56) References Cited

U.S. PATENT DOCUMENTS

| | | | |
|---|---|---|---|
| 5,333,275 A | 7/1994 | Wheatley et al. | |
| 5,437,050 A | 7/1995 | Lamb et al. | |
| 5,465,240 A | 11/1995 | Mankovitz | |
| 5,649,060 A | 7/1997 | Ellozy et al. | |
| 5,674,743 A | 10/1997 | Ulmer | |
| 5,740,230 A | 4/1998 | Vaudreuil | |
| 5,918,223 A | 6/1999 | Blum et al. | |
| 5,952,597 A | 9/1999 | Weinstock et al. | |
| 6,107,559 A | 8/2000 | Weinstock et al. | |
| 6,166,314 A | 12/2000 | Weinstock et al. | |
| 6,476,306 B2 | 11/2002 | Huopaniemi et al. | |
| 6,570,991 B1 | 5/2003 | Scheirer | |
| 6,792,007 B1 | 9/2004 | Hamada et al. | |
| 6,911,592 B1 | 6/2005 | Futamase | |
| 6,966,065 B1 | 11/2005 | Kitazato et al. | |
| 6,990,453 B2 | 1/2006 | Wang et al. | |
| 7,174,293 B2 | 2/2007 | Kenyon | |
| 7,190,971 B1 | 3/2007 | Kawamoto | |
| 7,194,752 B1 | 3/2007 | Kenyon et al. | |
| 7,277,766 B1 | 10/2007 | Khan et al. | |
| 7,346,512 B2 | 3/2008 | Wang et al. | |
| 7,359,889 B2 | 4/2008 | Wang et al. | |
| 7,444,353 B1 | 10/2008 | Chen et al. | |
| 7,549,052 B2 | 6/2009 | Haitsma et al. | |
| 7,574,451 B2 | 8/2009 | Burgess | |
| 7,627,477 B2 | 12/2009 | Wang | |
| 7,739,062 B2 | 6/2010 | Wang | |
| 7,853,664 B1 | 12/2010 | Wang et al. | |
| 7,865,368 B2 | 1/2011 | Wang et al. | |
| 7,870,088 B1* | 1/2011 | Chen et al. | |
| 7,881,657 B2 | 2/2011 | Wang et al. | |
| 7,986,913 B2 | 7/2011 | Wang | |
| 8,015,123 B2 | 9/2011 | Barton et al. | |
| 8,086,171 B2 | 12/2011 | Wang et al. | |
| 8,090,579 B2 | 1/2012 | DeBusk | |
| 8,190,435 B2 | 5/2012 | Wang et al. | |
| 8,311,950 B1* | 11/2012 | Kunal et al. | 705/319 |
| 8,869,184 B2* | 10/2014 | Robbins et al. | 725/14 |
| 2002/0072982 A1 | 6/2002 | Barton et al. | |
| 2002/0083060 A1 | 6/2002 | Wang et al. | |
| 2002/0087702 A1* | 7/2002 | Mori | 709/228 |
| 2004/0174875 A1* | 9/2004 | Geagan et al. | 370/389 |
| 2004/0199387 A1 | 10/2004 | Wang et al. | |
| 2004/0266337 A1 | 12/2004 | Radcliffe et al. | |
| 2005/0021621 A1* | 1/2005 | Welch et al. | 709/204 |
| 2005/0044189 A1 | 2/2005 | Ikezoye et al. | |
| 2005/0147256 A1 | 7/2005 | Peters et al. | |
| 2005/0267817 A1 | 12/2005 | Barton et al. | |
| 2006/0106867 A1 | 5/2006 | Burges et al. | |
| 2006/0112812 A1 | 6/2006 | Venkataraman et al. | |
| 2006/0122839 A1 | 6/2006 | Wang et al. | |
| 2006/0246408 A1 | 11/2006 | Gao | |
| 2007/0143777 A1 | 6/2007 | Wang | |
| 2007/0166683 A1* | 7/2007 | Chang et al. | 434/307 R |
| 2008/0000344 A1* | 1/2008 | Komori et al. | 84/609 |
| 2008/0082510 A1 | 4/2008 | Wang et al. | |
| 2008/0097754 A1 | 4/2008 | Goto et al. | |
| 2008/0115655 A1 | 5/2008 | Weng et al. | |
| 2008/0154401 A1 | 6/2008 | Wang et al. | |
| 2008/0196575 A1 | 8/2008 | Good | |
| 2008/0263360 A1 | 10/2008 | Haitsma et al. | |
| 2009/0083281 A1 | 3/2009 | Sarig et al. | |
| 2009/0282436 A1* | 11/2009 | Perry | 725/39 |
| 2010/0145708 A1 | 6/2010 | Master et al. | |
| 2010/0211693 A1 | 8/2010 | Master et al. | |
| 2010/0247060 A1 | 9/2010 | Gay et al. | |
| 2010/0268359 A1 | 10/2010 | Prestenback et al. | |
| 2011/0203006 A1* | 8/2011 | Gopalakrishnan | 726/29 |
| 2011/0244784 A1 | 10/2011 | Wang et al. | |
| 2011/0273455 A1 | 11/2011 | Powar et al. | |
| 2011/0276157 A1 | 11/2011 | Wang et al. | |
| 2011/0276333 A1 | 11/2011 | Wang et al. | |
| 2011/0276334 A1 | 11/2011 | Wang et al. | |
| 2011/0288862 A1 | 11/2011 | Todic | |
| 2011/0314132 A1 | 12/2011 | Barton et al. | |
| 2012/0076310 A1 | 3/2012 | DeBusk et al. | |
| 2012/0079515 A1 | 3/2012 | Wang et al. | |
| 2012/0317241 A1* | 12/2012 | Wang | 709/219 |
| 2013/0219076 A1* | 8/2013 | Islam et al. | 709/231 |

OTHER PUBLICATIONS

Kim et al., "Music Emotion Recognition: A state of the Art Review", 11th International Society for Music Information Retrieval Conference (2010).

Vy et al., "EnACT: A software tool for creating animated text captions", ICCHP 2008, LNCS 5105, pp. 609-616 (2008).

Geleijnse et al., "Enriching Music with Synchronized Lyrics, Images, and Colored Lights", Ambi-Sys'08, Feb. 11-14, 2008, Quebec, Canada.

Shi-Kuo Chang, Zen Chen, Suh-Yin Lee / Oostveen, J., et al., "Recent Advances in Visual Information Systems", 5th International Conference, VISUAL 2002, "Feature Extraction and a Database Strategy for Video Fingerprinting", Lecture Notes in Computer Science, 2314, (Mar. 11, 2002), 117-128.

Macrae et al., "MuViSync: Realtime Music Video Alignment", available from http://www.xavieranguera.com/papers/icme2010.pdf, at least on Dec. 2, 2010.

Kan et al., "LyricAlly: Automatic Synchronization of Textual Lyrics to Acoustic Music Signals", IEEE Transactions on Audio, Speech and Language Processing, vol. 16, No. 2, Feb. 2008, pp. 338-349.

Mesaros, "Automatic Alignment of Music Audio and Lyrics", Proc. of the 11th Int. Conference on Digital Audio Effects (DAFx-08), Espoo, Finland, Sep. 1-4, 2008, pp. DAFX-1-DAFX-4.

Young et al., The HTK Book (for HTK Version 3.4), first published Dec. 1995.

Fujihara et al., "Three Techniques for Improving Automatic Synchronization Between Music and Lyrics: Fricative Detection, Filler, Model, and Novel Feature Vectors for Vocal Activity Detection", National Institute of Advanced Industrial Science and Technology, 2008, pp. 69-72.

Fujihara et al., "Automatic Synchronization Between Lyrics and Music CD Recordings based on Viterbi Alignment of Segragated Vocal Signals", Proceedings of the Eighth IEEE International Symposium on Multimedia, 2006.

http://waltdisneyworldflorida.net/walt-disney-news/walt-disney-tron-bambi-to-employ-disneys-second-screen-technology-on-dvd-blu-ray/, visited and printed from Internet May 4, 2011.

http://www.razorianfly.com/2011/02/12/details-on-tron-legacy-for-blu-ray-surface-disneys-second-screen-for-ipad/, visited and printed from Internet on May 4, 2011.

International Search Report and Written Opinion prepared by the European Patent Office in International Patent Application Serial No. PCT/US2012/040754, mailed Jul. 31, 2012.

Tsutsui, Hideki Digital Media Processing Leading Technologies (Commutents Communication Support System via Blog and Video Contents), Toshiba Review, Toshiba Corporation, Dec. 1, 2007, vol. 62, No. 12, pp. 62-65; English Language Abstract of Tsutsui above, Toshiba Review, Toshiba Corporation, Dec. 1, 2007, vol. 62, No. 12 (See p. 3, Second Paragraph).

Sheirer and Slaney, "Construction and Evaluation of a Robust Multifeature Speech/Music Discriminator", published in Proceeding ICASSP 1997 (Proceedings of the 1997 IEEE International Conference on Acoustics, Speech, and Signal Processing (ICASSP '97)), vol. 2.

* cited by examiner

METHODS AND SYSTEMS FOR IDENTIFYING CONTENT IN A DATA STREAM

CROSS REFERENCE TO RELATED APPLICATION

The present application claims priority to U.S. Provisional Patent Application Ser. No. 61/495,571, filed on Jun. 10, 2011, the entire contents of which are herein incorporated by reference.

FIELD

The present disclosure relates to identifying content in a data stream. For example, the present disclosure relates to a client device continuously performing a content identification of content in a data stream based on content patterns stored on the client device, and in some instances, querying a server to determine an identity of content in the data stream.

BACKGROUND

Content identification systems for various data types, such as audio or video, use many different methods. A client device may capture a media sample recording of a media stream (such as radio), and may then request a server to perform a search in a database of media recordings (also known as media tracks) for a match to identify the media stream. For example, the sample recording may be passed to a content identification server module, which can perform content identification of the sample and return a result of the identification to the client device. A recognition result may then be displayed to a user on the client device or used for various follow-on services, such as purchasing or referencing related information. Other applications for content identification include broadcast monitoring or content-sensitive advertising, for example.

Existing content identification systems may require user interaction to initiate a content identification request. Often times, a user may initiate a request after a song has ended, for example, missing an opportunity to identify the song.

In addition, within content identification systems, a central server receives content identification requests from client devices and performs computational intensive procedures to identify content of the sample. A large number of requests can cause delays when providing results to client devices due to a limited number of servers available to perform a recognition.

SUMMARY

In one example, a method for identifying content in a data stream is provided. The method comprises receiving a continuous data stream at a client device, and at the client device, substantially continuously performing a content identification of content in the data stream based on content patterns stored on the client device. The content patterns may include information to identify pieces of content. The method further comprises based on receiving an instruction, the client device querying a server to determine an identity of content in the data stream.

In another example, a non-transitory computer readable medium having stored therein instructions executable by a computing device to cause the computing device to perform functions is provided. The functions comprise receiving a continuous data stream at the computing device, and at the computing device, continuously performing a content identification of content in the data stream based on content patterns stored on the computing device. The content patterns may include information to identify pieces of content. The functions further comprise based on receiving an instruction, the computing device querying a server to determine an identity of content in the data stream.

In still another example, a system for identifying content in a data stream is provided that comprises a processor, and data storage storing instructions executable by the processor to perform functions of receiving a continuous data stream at a computing device, and at the computing device, continuously performing a content identification of content in the data stream based on content patterns stored on the computing device. The content patterns may include information to identify pieces of content. The functions further comprise based on receiving an instruction, the computing device querying a server to determine an identity of content in the data stream.

In yet another example, a system for identifying content in a data stream is provided that comprises a recognition server and a request server. The recognition server may be configured to receive from a client device a query to determine an identity of content, and the query may include a sample of the content. The request server may be configured to instruct the client device to operate in a continuous identification mode, and the client device may continuously perform content identifications of content within a received data stream at the client device in the continuous identification mode.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

This disclosure may describe, inter alia, methods and systems for identifying content in a data stream. In one example, a client device receives a continuous data stream and substantially continuously performs a content identification of content in the data stream based on content patterns stored on the client device. The content patterns stored on the client device may include information associated with extracted features of a media file, or a temporally mapped collection of features describing a media file. The client device may determine whether the continuous data stream includes media content, and based on the determination, continuously perform the content identification of content in the data stream at the client device. The client device may query a server to determine an identity of content in the data stream based on receiving an instruction.

Figure 1:
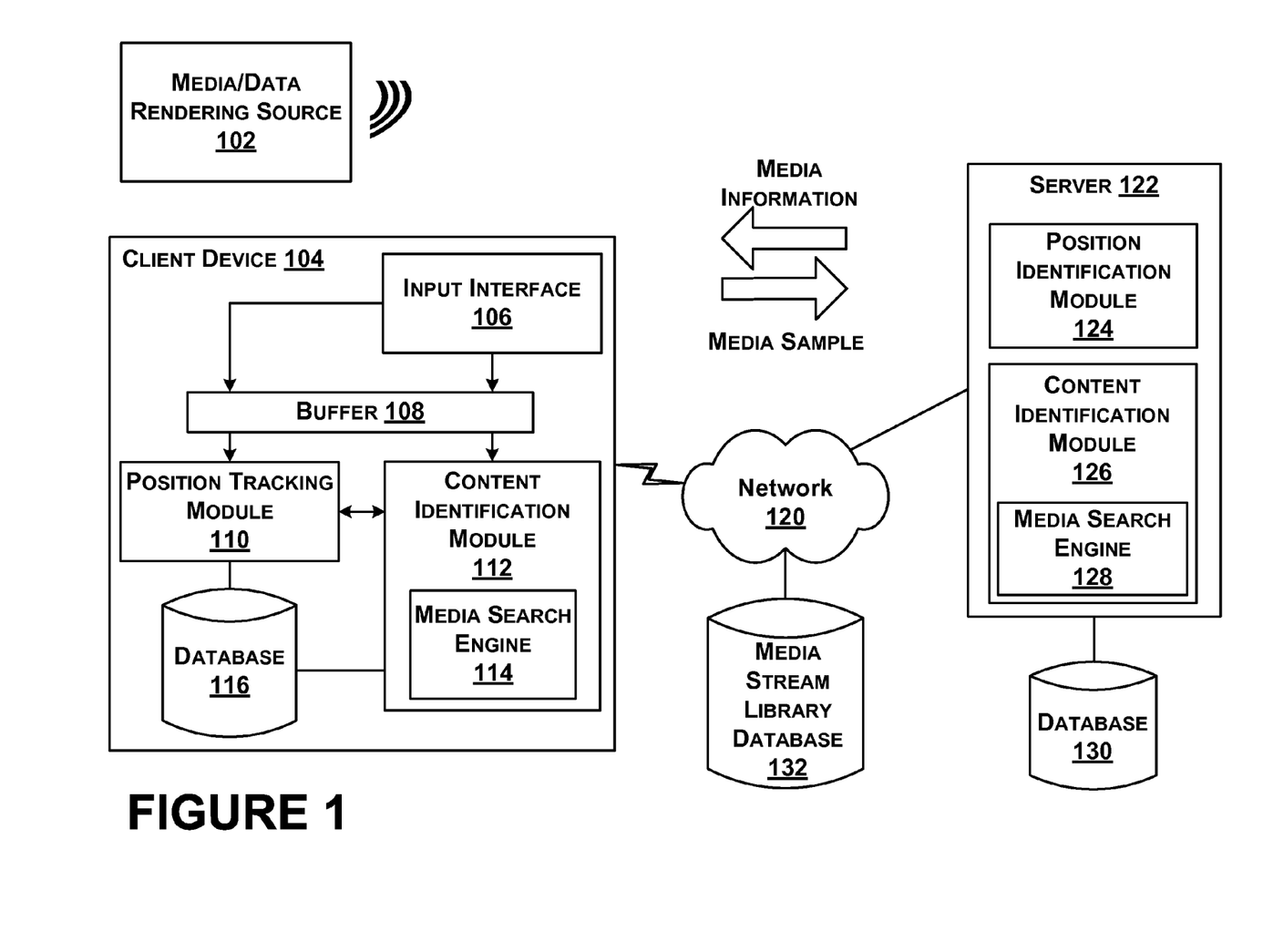
FIG. 1 illustrates one example of a system for identifying content within a data stream.

Referring now to the figures, FIG. 1 illustrates one example of a system for identifying content within a data stream. While FIG. 1 illustrates a system that has a given configuration, the components within the system may be arranged in other manners. The system includes a media or data rendering source 102 that renders and presents data content from a data stream in any known manner. The data stream may be stored on the media rendering source 102 or received from external sources, such as an analog or digital broadcast. In one example, the media rendering source 102 may be a radio station or a television content provider that broadcasts media streams (e.g., audio and/or video) and/or other information. The media rendering source 102 may also be any type of device that plays or audio or video media in a recorded or live format. In an alternate example, the media rendering source 102 may include a live performance as a source of audio and/or a source of video, for example.

The media rendering source 102 may render or present the media stream through a graphical display, audio speakers, a MIDI musical instrument, an animatronic puppet, etc., or any other kind of presentation provided by the media rendering source 102, for example.

A client device 104 receives a rendering of the media stream from the media rendering source 102 through an input interface 106. In one example, the input interface 106 may include antenna, in which case the media rendering source 102 may broadcast the media stream wirelessly to the client device 104. However, depending on a form of the media stream, the media rendering source 102 may render the media using wireless or wired communication techniques. In other examples, the input interface 106 can include any of a microphone, video camera, vibration sensor, radio receiver, network interface, etc. As a specific example, the media rendering source 102 may play music, and the input interface 106 may include a microphone to receive a sample of the music.

Within examples, the client device 104 may not be operationally coupled to the media rendering source 102, other than to receive the rendering of the media stream. In this manner, the client device 104 may not be controlled by the media rendering source 102, and may not be an integral portion of the media rendering source 102. In the example shown in FIG. 1, the client device 104 is a separate entity from the media rendering source 102.

The input interface 106 is configured to capture a media sample of the rendered media stream. The input interface 106 may be preprogrammed to capture media samples continuously without user intervention, such as to record all audio received and store recordings in a buffer 108. The buffer 108 may store a number of recordings, or may store recordings for a limited time, such that the client device 104 may record and store recordings in predetermined intervals, for example. In other examples, capturing of the media sample may be affected by a user activating a button or other application to trigger the sample capture. For example, a user of the client device 104 may press a button to record a ten second digital sample of audio through a microphone, or to capture a still image or video sequence using a camera.

The client device 104 can be implemented as a portion of a small-form factor portable (or mobile) electronic device such as a cell phone, a wireless cell phone, a personal data assistant (PDA), a personal media player device, a wireless web-watch device, a personal headset device, an application specific device, or a hybrid device that include any of the above functions. The client device 104 can also be implemented as a personal computer including both laptop computer and non-laptop computer configurations. The client device 104 can also be a component of a larger device or system as well.

The client device further includes a position identification module 110 and a content identification module 112. The position identification module 110 is configured to receive a media sample from the buffer 108 and to identify a corresponding estimated time position ($T_S$) indicating a time offset of the media sample into the rendered media stream based on the media sample that is being captured at that moment. The time position ($T_S$) may also, in some examples, be an elapsed amount of time from a beginning of the media stream.

The content identification module 112 is configured to receive the media sample from the buffer 108 and to perform a content identification on the received media sample. The content identification identifies a media stream, or identifies information about or related to the media sample. The content identification module 112 may used or be incorporated within any example media sample information retrieval services, such as provided by Shazam Entertainment in London, United Kingdom, Gracenote in Emeryville, Calif., or Melodis in San Jose, Calif., for example. These services operate to receive samples of environmental audio, identify a musical content of the audio sample, and provide the user with information about the music, including the track name, artist, album, artwork, biography, discography, concert tickets, etc.

In this regard, the content identification module 112 includes a media search engine 114 and may include or be coupled to a database 116 that indexes reference media streams, for example, to compare the received media sample with the stored information so as to identify tracks within the received media sample. Once tracks within the media stream have been identified, track identities or other information may be displayed on a display of the client device 104.

The database 116 may store content patterns that include information to identify pieces of content. The content patterns may include media recordings and each recording may be identified by a unique identifier (e.g., sound_ID). Alternatively, the database 116 may not necessarily store audio or video files for each recording, since the sound_IDs can be used to retrieve audio files from elsewhere. The content patterns may include other information, such as reference signature files including a temporally mapped collection of features describing content of a media recording that has a temporal dimension corresponding to a timeline of the media recording, and each feature may be a description of the content in a vicinity of each mapped timepoint. The content patterns may further include information associated with extracted features of a media file. The database 116 may include a number of content patterns enabling the client device 104 to perform content identifications of content matching to the locally stored content patterns.

The database 116 may also include information for each stored content pattern, such as metadata that indicates information about the content pattern like an artist name, a length of song, lyrics of the song, time indices for lines or words of the lyrics, album artwork, or any other identifying or related information to the file.

The system in FIG. 1 further includes a network 120 to which the client device 104 may be coupled via a wireless or wired link. A server 122 is provided coupled to the network 120, and the server 122 includes a position identification module 124 and a content identification module 126. Although FIG. 1 illustrates the server 122 to include both the position identification module 124 and the content identification module 126, either of the position identification module 124 and/or the content identification module 126 may be separate entities apart from the server 122, for example. In addition, the position identification module 124 and/or the content identification module 126 may be on a remote server connected to the server 122 over the network 120, for example.

In some examples, the client device 104 may capture a media sample and may send the media sample over the network 120 to the server 122 to determine an identity of content in the media sample. The position identification module 124 and the content identification module 126 of the server 122 may be configured to operate similar to the position identification module 110 and the content identification module 112 of the client device 104. In this regard, the content identification module 126 includes a media search engine 128 and may include or be coupled to a database 130 that indexes reference media streams, for example, to compare the received media sample with the stored information so as to identify tracks within the received media sample. Once tracks within the media stream have been identified, track identities or other information may be returned to the client device 104.

In other examples, the client device 104 may capture a sample of a media stream from the media rendering source 102, and may perform initial processing on the sample so as to create a fingerprint of the media sample. The client device 104 may then send the fingerprint information to the position identification module 124 and/or the content identification module 126 of the server 122, which may identify information pertaining to the sample based on the fingerprint information alone. In this manner, more computation or identification processing can be performed at the client device 104, rather than at the server 122, for example.

The client device 104 may be configured to first attempt a content identification of a received media sample, and if unsuccessful, the client device 104 may query the server 122 to determine an identity of content in the data stream. In other examples, the client device 104 may query the server 122 based on receiving an instruction to do so from a user.

Various content identification techniques are known in the art for performing computational content identifications of media samples and features of media samples using a database of media tracks. The following U.S. Patents and publications describe possible examples for media recognition techniques, and each is entirely incorporated herein by reference, as if fully set forth in this description: Kenyon et al, U.S. Pat. No. 4,843,562, entitled "Broadcast Information Classification System and Method"; Kenyon, U.S. Pat. No. 4,450, 531, entitled "Broadcast Signal Recognition System and Method"; Haitsma et al, U.S. Patent Application Publication No. 2008/0263360, entitled "Generating and Matching Hashes of Multimedia Content"; Wang and Culbert, U.S. Pat. No. 7,627,477, entitled "Robust and Invariant Audio Pattern Matching"; Wang, Avery, U.S. Patent Application Publication No. 2007/0143777, entitled "Method and Apparatus for Identification of Broadcast Source"; Wang and Smith, U.S. Pat. No. 6,990,453, entitled "System and Methods for Recognizing Sound and Music Signals in High Noise and Distortion"; and Blum, et al, U.S. Pat. No. 5,918,223, entitled "Method and Article of Manufacture for Content-Based Analysis, Storage, Retrieval, and Segmentation of Audio Information".

Briefly, the content identification module (within the client device 104 or the server 122) may be configured to receive a media recording and sample the media recording. The recording can be correlated with digitized, normalized reference signal segments to obtain correlation function peaks for each resultant correlation segment to provide a recognition signal when the spacing between the correlation function peaks is within a predetermined limit. A pattern of RMS power values coincident with the correlation function peaks may match within predetermined limits of a pattern of the RMS power values from the digitized reference signal segments, as noted in U.S. Pat. No. 4,450,531, which is entirely incorporated by reference herein, for example. The matching media content can thus be identified. Furthermore, the matching position of the media recording in the media content is given by the position of the matching correlation segment, as well as the offset of the correlation peaks, for example.

Figure 2:
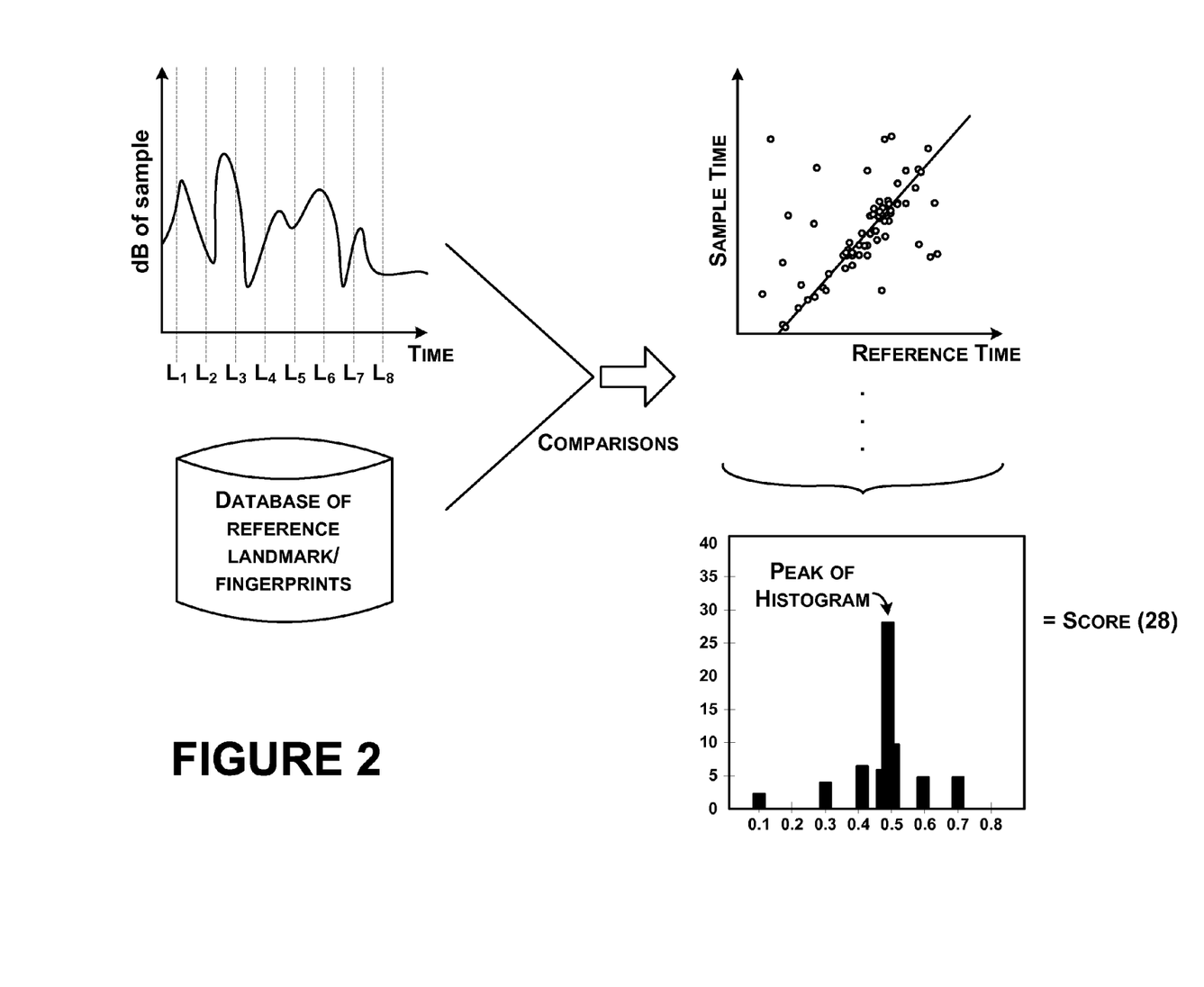
FIG. 2 illustrates an example content identification method.

FIG. 2 illustrates another example content identification method. Generally, media content can be identified by identifying or computing characteristics or fingerprints of a media sample and comparing the fingerprints to previously identified fingerprints of reference media files. Particular locations within the sample at which fingerprints are computed may depend on reproducible points in the sample. Such reproducibly computable locations are referred to as "landmarks." A location within the sample of the landmarks can be determined by the sample itself, i.e., is dependent upon sample qualities and is reproducible. That is, the same or similar landmarks may be computed for the same signal each time the process is repeated. A landmarking scheme may mark about 5 to about 10 landmarks per second of sound recording; however, landmarking density may depend on an amount of activity within the media recording. One landmarking technique, known as Power Norm, is to calculate an instantaneous power at many time points in the recording and to select local maxima. One way of doing this is to calculate an envelope by rectifying and filtering a waveform directly. Another way is to calculate a Hilbert transform (quadrature) of a signal and use a sum of magnitudes squared of the Hilbert transform and the original signal. Other methods for calculating landmarks may also be used.

FIG. 2 illustrates an example plot of dB (magnitude) of a sample vs. time. The plot illustrates a number of identified landmark positions ($L_1$ to $L_8$). Once the landmarks have been determined, a fingerprint is computed at or near each landmark time point in the recording. A nearness of a feature to a landmark is defined by the fingerprinting method used. In some cases, a feature is considered near a landmark if the feature clearly corresponds to the landmark and not to a previous or subsequent landmark. In other cases, features correspond to multiple adjacent landmarks. The fingerprint is generally a value or set of values that summarizes a set of features in the recording at or near the landmark time point. In one example, each fingerprint is a single numerical value that is a hashed function of multiple features. Other examples of fingerprints include spectral slice fingerprints, multi-slice fingerprints, LPC coefficients, cepstral coefficients, and frequency components of spectrogram peaks.

Fingerprints can be computed by any type of digital signal processing or frequency analysis of the signal. In one example, to generate spectral slice fingerprints, a frequency analysis is performed in the neighborhood of each landmark timepoint to extract the top several spectral peaks. A fingerprint value may then be the single frequency value of a strongest spectral peak. For more information on calculating characteristics or fingerprints of audio samples, the reader is referred to U.S. Pat. No. 6,990,453, to Wang and Smith, entitled "System and Methods for Recognizing Sound and Music Signals in High Noise and Distortion," the entire disclosure of which is herein incorporated by reference as if fully set forth in this description.

Thus, referring back to FIG. 1, the client device 104 or the server 122 may receive a recording (e.g., media/data sample) and compute fingerprints of the recording. In one example, to identify information about the recording, the content identification module 112 of the client device 104 can then access the database 116 to match the fingerprints of the recording with fingerprints of known audio tracks by generating correspondences between equivalent fingerprints and files in the database 116 to locate a file that has a largest number of linearly related correspondences, or whose relative locations of characteristic fingerprints most closely match the relative locations of the same fingerprints of the recording.

Referring to FIG. 2, a scatter plot of landmarks of the sample and a reference file at which fingerprints match (or substantially match) is illustrated. The sample may be compared to a number of reference files to generate a number of scatter plots. After generating a scatter plot, linear correspondences between the landmark pairs can be identified, and sets can be scored according to the number of pairs that are linearly related. A linear correspondence may occur when a statistically significant number of corresponding sample locations and reference file locations can be described with substantially the same linear equation, within an allowed tolerance, for example. The file of the set with the highest statistically significant score, i.e., with the largest number of linearly related correspondences, is the winning file, and may be deemed the matching media file.

In one example, to generate a score for a file, a histogram of offset values can be generated. The offset values may be differences in landmark time positions between the sample and the reference file where a fingerprint matches. FIG. 2 illustrates an example histogram of offset values. The reference file may be given a score that is equal to the peak of the histogram (e.g., score=28 in FIG. 2). Each reference file can be processed in this manner to generate a score, and the reference file that has a highest score may be determined to be a match to the sample.

As yet another example of a technique to identify content within the media stream, a media sample can be analyzed to identify its content using a localized matching technique. For example, generally, a relationship between two media samples can be characterized by first matching certain fingerprint objects derived from the respective samples. A set of fingerprint objects, each occurring at a particular location, is generated for each media sample. Each location is determined depending upon the content of a respective media sample and each fingerprint object characterizes one or more local features at or near the respective particular location. A relative value is next determined for each pair of matched fingerprint objects. A histogram of the relative values is then generated. If a statistically significant peak is found, the two media samples can be characterized as substantially matching. Additionally, a time stretch ratio, which indicates how much an audio sample has been sped up or slowed down as compared to the original/reference audio track can be determined. For a more detailed explanation of this method, the reader is referred to U.S. Pat. No. 7,627,477, to Wang and Culbert, entitled Robust and Invariant Audio Pattern Matching, the entire disclosure of which is herein incorporated by reference as if fully set forth in this description.

In addition, systems and methods described within the publications above may return more than an identity of a media sample. For example, using the method described in U.S. Pat. No. 6,990,453 to Wang and Smith may return, in addition to metadata associated with an identified audio track, a relative time offset (RTO) of a media sample from a beginning of an identified sample. To determine a relative time offset of the recording, fingerprints of the sample can be compared with fingerprints of the original files to which the fingerprints match. Each fingerprint occurs at a given time, so after matching fingerprints to identify the sample, a difference in time between a first fingerprint (of the matching fingerprint in the sample) and a first fingerprint of the stored original file will be a time offset of the sample, e.g., amount of time into a song. Thus, a relative time offset (e.g., 67 seconds into a song) at which the sample was taken can be determined. Other information may be used as well to determine the RTO. For example, a location of a histogram peak may be considered the time offset from a beginning of the reference recording to the beginning of the sample recording.

Other forms of content identification may also be performed depending on a type of the media sample. For example, a video identification algorithm may be used to identify a position within a video stream (e.g., a movie). An example video identification algorithm is described in Oostveen, J., et al., "Feature Extraction and a Database Strategy for Video Fingerprinting", Lecture Notes in Computer Science, 2314, (Mar. 11, 2002), 117-128, the entire contents of which are herein incorporated by reference. For example, a position of the video sample into a video can be derived by determining which video frame was identified. To identify the video frame, frames of the media sample can be divided into a grid of rows and columns, and for each block of the grid, a mean of the luminance values of pixels is computed. A spatial filter can be applied to the computed mean luminance values to derive fingerprint bits for each block of the grid. The fingerprint bits can be used to uniquely identify the frame, and can be compared or matched to fingerprint bits of a database that includes known media. The extracted fingerprint bits from a frame may be referred to as sub-fingerprints, and a fingerprint block is a fixed number of sub-fingerprints from consecutive frames. Using the sub-fingerprints and fingerprint blocks, identification of video samples can be performed. Based on which frame the media sample included, a position into the video (e.g., time offset) can be determined Furthermore, other forms of content identification may also be performed, such as using watermarking methods. A watermarking method can be used by the position identification module 110 of the client device 104 (and similarly by the position identification module 124 of the server 122) to determine the time offset such that the media stream may have embedded watermarks at intervals, and each watermark may specify a time or position of the watermark either directly, or indirectly via a database lookup, for example.

In some of the foregoing example content identification methods for implementing functions of the content identification module 112, a byproduct of the identification process may be a time offset of the media sample within the media stream. Thus, in such examples, the position identification module 110 may be the same as the content identification module 112, or functions of the position identification module 110 may be performed by the content identification module 112.

In some examples, the client device 104 or the server 122 may further access a media stream library database 132 through the network 120 to select a media stream corresponding to the sampled media that may then be returned to the client device 104 to be rendered by the client device 104.

Information in the media stream library database 132, or the media stream library database 132 itself, may be included within the database 116.

A media stream corresponding to the media sample may be manually selected by a user of the client device 104, programmatically by the client device 104, or selected by the server 122 based on an identity of the media sample, for example. The selected media stream may be a different kind of media from the media sample, and may be synchronized to the media being rendered by the media rendering source 102. For example, the media sample may be music, and the selected media stream may be lyrics, a musical score, a guitar tablature, musical accompaniment, a video, animatronic puppet dance, an animation sequence, etc., which can be synchronized to the music. The client device 104 may receive the selected media stream corresponding to the media sample, and may render the selected media stream in synchrony with the media being rendered by the media rendering source 102.

An estimated time position of the media being rendered by the media rendering source 102 is determined by the position identification module 110 and used to determine a corresponding position within the selected media stream at which to render the selected media stream. When the client device 104 is triggered to capture a media sample, a timestamp ($T_0$) is recorded from a reference clock of the client device 104. At any time t, an estimated real-time media stream position $T_r(t)$ is determined from the estimated identified media stream position $T_S$ plus elapsed time since the time of the timestamp:

$$T_r(t)=T_S+t-T_0 \quad \text{Equation (1)}$$

$T_r(t)$ is an elapsed amount of time from a beginning of the media stream to a real-time position of the media stream as is currently being rendered. Thus, using $T_S$ (i.e., the estimated elapsed amount of time from a beginning of the media stream to a position of the media stream based on the recorded sample), the $T_r(t)$ can be calculated. $T_r(t)$ is then used by the client device 104 to present the selected media stream in synchrony with the media being rendered by the media rendering source 102. For example, the client device 104 may begin rendering the selected media stream at the time position $T_r(t)$, or at a position such that $T_r(t)$ amount of time has elapsed so as to render and present the selected media stream in synchrony with the media being rendered by the media rendering source 102.

In some embodiments, to mitigate or prevent the selected media stream from falling out of synchrony with the media being rendered by the media rendering source 102, the estimated position $T_r(t)$ can be adjusted according to a speed adjustment ratio R. For example, methods described in U.S. Pat. No. 7,627,477, entitled "Robust and invariant audio pattern matching", the entire contents of which are herein incorporated by reference, can be performed to identify the media sample, the estimated identified media stream position $T_S$, and a speed ratio R. To estimate the speed ratio R, cross-frequency ratios of variant parts of matching fingerprints are calculated, and because frequency is inversely proportional to time, a cross-time ratio is the reciprocal of the cross-frequency ratio. A cross-speed ratio R is the cross-frequency ratio (e.g., the reciprocal of the cross-time ratio).

More specifically, using the methods described above, a relationship between two audio samples can be characterized by generating a time-frequency spectrogram of the samples (e.g., computing a Fourier Transform to generate frequency bins in each frame), and identifying local energy peaks of the spectrogram. Information related to the local energy peaks is extracted and summarized into a list of fingerprint objects, each of which optionally includes a location field, a variant component, and an invariant component. Certain fingerprint objects derived from the spectrogram of the respective audio samples can then be matched. A relative value is determined for each pair of matched fingerprint objects, which may be, for example, a quotient or difference of logarithm of parametric values of the respective audio samples.

In one example, local pairs of spectral peaks are chosen from the spectrogram of the media sample, and each local pair comprises a fingerprint. Similarly, local pairs of spectral peaks are chosen from the spectrogram of a known media stream, and each local pair comprises a fingerprint. Matching fingerprints between the sample and the known media stream can be determined, and time differences between the spectral peaks for each of the sample and the media stream can be calculated. For instance, a time difference between two peaks of the sample is determined and compared to a time difference between two peaks of the known media stream. A ratio of these two time differences can be compared and a histogram can be generated comprising many of such ratios (e.g., extracted from matching pairs of fingerprints). A peak of the histogram may be determined to be an actual speed ratio (e.g., difference between speed at which the media rendering source 102 is playing the media compared to speed at which media is rendered on reference media file). Thus, an estimate of the speed ratio R can be obtained by finding a peak in the histogram, for example, such that the peak in the histogram characterizes the relationship between the two audio samples as a relative pitch, or, in case of linear stretch, a relative playback speed.

Thus, the global relative value (e.g., speed ratio R) can be calculated from matched fingerprint objects using corresponding variant components from the two audio samples. The variant component may be a frequency value determined from a local feature near the location of each fingerprint object. The speed ratio R could be a ratio of frequencies or delta times, or some other function that results in an estimate of a global parameter used to describe the mapping between the two audio samples. The speed ratio R may be considered an estimate of the relative playback speed, for example.

The speed ratio R can be estimated using other methods as well. For example, multiple samples of the media can be captured, and content identification can be performed on each sample to obtain multiple estimated media stream positions $T_S(k)$ at reference clock time $T_0(k)$ for the k-th sample. Then, R could be estimated as:

$$R_k = \frac{T_S(k) - T_S(1)}{T_0(k) - T_0(1)} \quad \text{Equation (2)}$$

To represent R as time-varying, the following equation may be used:

$$R_k = \frac{T_S(k) - T_S(k-1)}{T_0(k) - T_0(k-1)} \quad \text{Equation (3)}$$

Thus, the speed ratio R can be calculated using the estimated time positions $T_S$ over a span of time to determine the speed at which the media is being rendered by the media rendering source 102.

Using the speed ratio R, an estimate of the real-time media stream position can be calculated as:

$$T_r(t)=T_S+R(t-T_0) \quad \text{Equation (4)}$$

The real-time media stream position indicates the position in time of the media sample. For example, if the media sample is from a song that has a length of four minutes, and if $T_r(t)$ is one minute, that indicates that the one minute of the song has elapsed.

Figure 3:
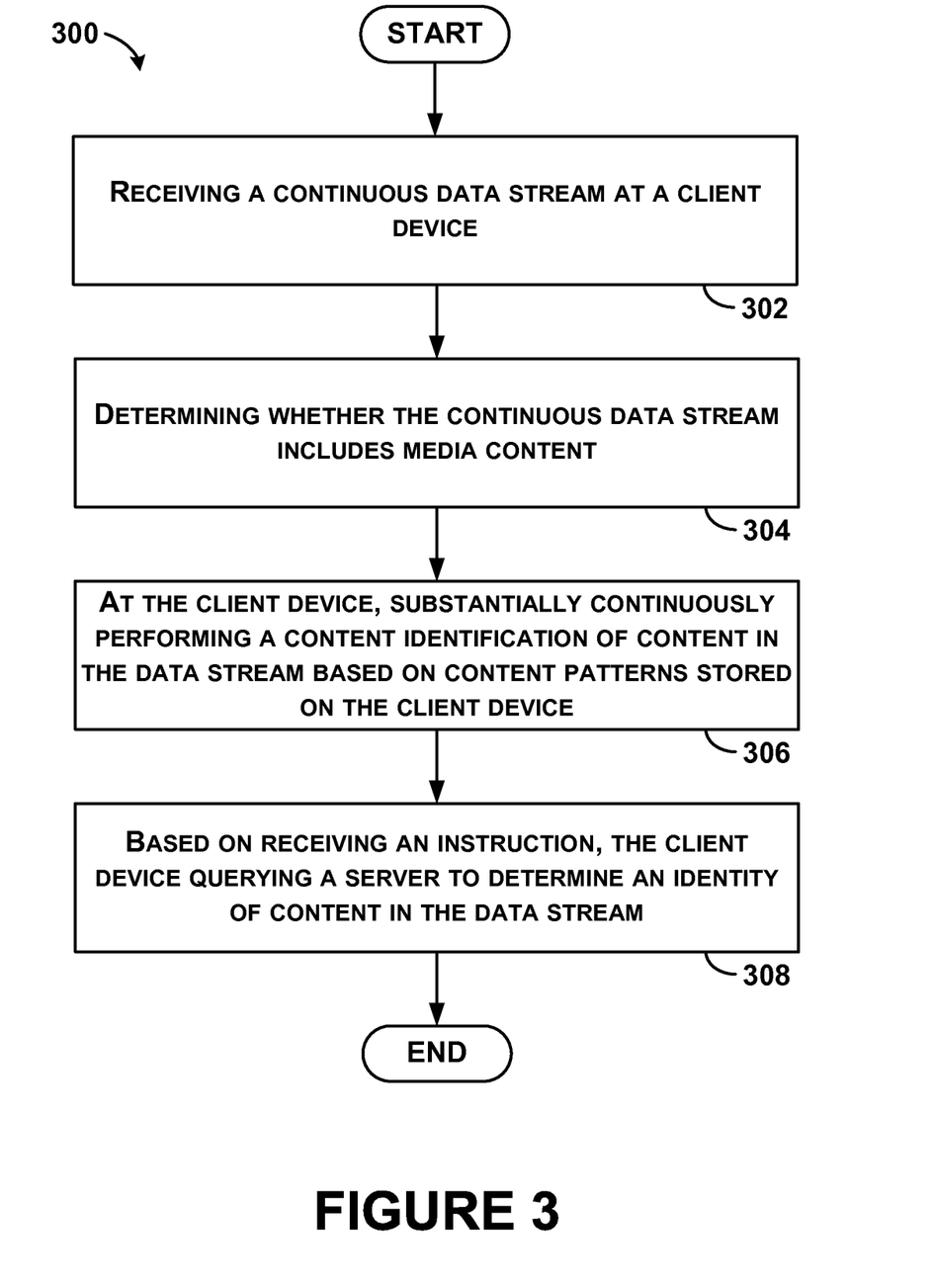
FIG. 3 shows a flowchart of an example method for identifying content in a data stream.

FIG. 3 shows a flowchart of an example method 300 for identifying content in a data stream. It should be understood that for this and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium or data storage, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a tangible computer readable storage medium, for example.

In addition, each block in FIG. 3 may represent circuitry that is wired to perform the specific logical functions in the process. Alternative implementations are included within the scope of the example embodiments of the present disclosure in which functions may be executed out of order from that shown or discussed, including substantially concurrent or in reverse order, depending on the functionality involved, as would be understood by those reasonably skilled in the art.

The method 300 includes, at block 302, receiving a continuous data stream at a client device. The continuous data stream may include any type of data or media, such as a radio broadcast, television audio/video, or any audio being rendered. The data stream may be continuously rendered by a source, and thus, the client device may continuously receive the data stream. In some examples, the client device may receive a substantially continuous data stream, such that the client device receives a substantial portion of the data stream rendered, or such that the client device receives the data stream at substantially all times.

The method 300 includes, at block 304, determining whether the continuous data stream includes media content. In one example, the client device may process the data stream to determine variations of features of the data stream including distinguishing changes in voiced and unvoiced components of speech and comparing the data stream with known characteristics of media content to determine whether the data stream includes media content. In one example, the client device may determine whether the data stream includes media content, such as audio comprising a song, using methods described in U.S. Pat. No. 6,570,991, the entire contents of which are hereby incorporated by reference. In other examples, the client device may determine whether the data stream includes media content, such as audio comprising a song, using methods described in "Construction and Evaluation of a Robust Multifeature Speech/Music Discriminator", by Sheirer and Slaney, published in Proceeding ICASSP 1997 (Proceedings of the 1997 IEEE International Conference on Acoustics, Speech, and Signal Processing (ICASSP '97)), Volume 2, the entire contents of which are hereby incorporated by reference.

The method 300 includes, at block 306, at the client device, substantially continuously performing a content identification of content in the data stream based on content patterns stored on the client device. The content patterns may include information to identify pieces of content, and may include any type of information such as information associated with extracted features of a media file or a temporally mapped collection of features describing a media file, for example. Each content pattern may further include landmark-fingerprint pairs for a given reference file, for example.

The client device may receive the continuous data stream and may continuously perform content identifications. In this manner, the client device may attempt to identify all content that is received. The content identifications may be substantially continuously performed, such that content identifications are performed at all times or substantially all the time while the client device is operating, or while an application comprising content identification functions is running, for example.

In some examples, content identifications can be performed upon receiving the data stream, and thus, no content identifications may be performed when the data stream is not received. The client device may be configured to continuously receive a data stream from a microphone (e.g., always capture ambient audio). In one example, based on the determination of whether the data stream includes media content (at block 304), the client device may then continuously perform the content identification of content in the data stream at the client device so that the client device performs the content identifications when the data stream includes media data (and not when the data stream includes random ambient noise).

The client device may be configured to continuously perform the content identifications so as to perform a content identification without user input (e.g., the user does not have to trigger the client device to perform the content identification). A user of the client device may initiate an application that continuously performs the content identifications or may configure a setting on the client device such that the client device continuously performs the content identifications.

The method 300 includes, at block 308, based on receiving an instruction, the client device querying a server to determine an identity of content in the data stream. The client device may perform the content identifications based on the locally stored content patterns on the client device. The client device may include a limited number of content patterns, and thus, content identification capabilities of the client device may be limited. Thus, in one example, a user may provide an instruction to query the server to determine an identity of content. A user may provide the instruction at times when the client device fails to identify content, for example, such as if the locally stored content patterns do not match any content within the data stream.

As another example, if content in the data stream includes media content and is not identified at the client device, the client device may provide a notification to the user, and the user may provide a selection of the notification causing the client device to query the server to determine the identity of content in the data stream.

The client device may further query the server to verify an identification of content performed by the client device, either based on a user request to do so or in instances in which the content identification has a low probability of being correct (e.g., a number of matching fingerprints below a predetermined threshold).

Using the method 300 in FIG. 3, featured content may be identified locally by the client device (based on locally stored content patterns), and any content not identified by the client device can be identified by the server. The method 300 enables all content identification processing to be performed on the client device (e.g., extract features of the sample, search limited set of content patterns stored on the phone, etc.). In one example, when featured content is captured by the client device, the client device can perform the content identification and provide a notification (e.g., pop-up window) indicating recognition. The method 300 may provide a zero-click tagging experience for users to notify users when featured content is identified.

Content patterns that are uploaded and stored on the client device may be associated with media files that are determined to be more likely to be rendered by a media source. Thus, content patterns of popular content or featured content can be stored on the client device so that the client device can first attempt to perform a local content identification, and if failed, the user may instruct the client device to query the server.

The client device may perform a number of functions after identifying content in the data stream, such as displaying advertisements related to the identified content or displaying synchronized media related to the identified content, for example. As another example, after identifying content, the client device may direct a user to a website, video, etc., that is related to the content or not related to the content.

Figure 4:
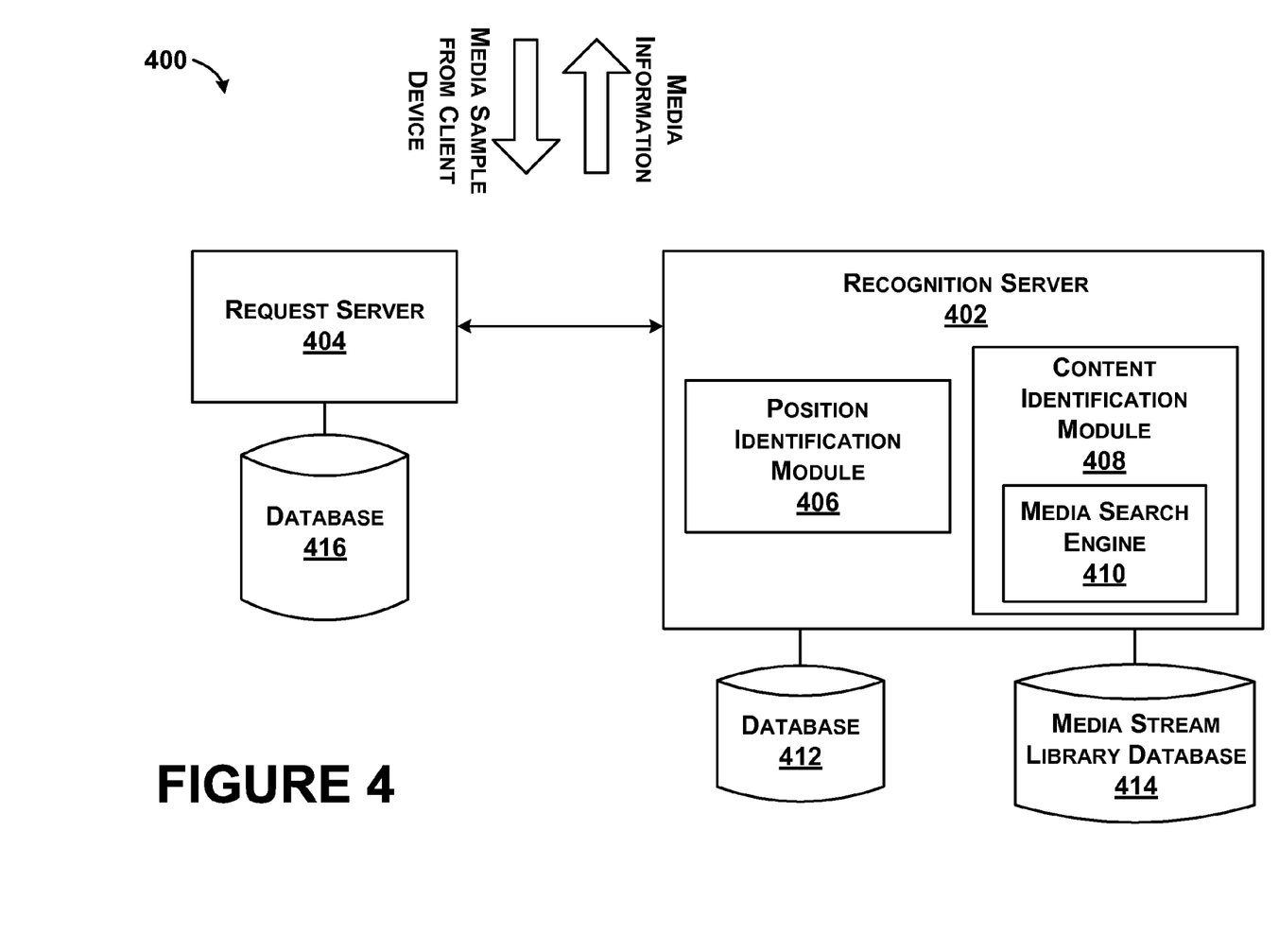
FIG. 4 illustrates an example system for identifying content in a data stream.

FIG. 4 illustrates an example system 400 for identifying content in a data stream. One or more of the described functions or components of the system in FIG. 4 may be divided up into additional functional or physical components, or combined into fewer functional or physical components. In some further examples, additional functional and/or physical components may be added to the examples illustrated by FIG. 4.

The system 400 includes a recognition server 402 and a request server 404. The recognition server 402 may be configured to receive from a client device a query to determine an identity of content, and the query may include a sample of the content. The recognition server 402 includes a position identification module 406, a content identification module 408 including a media search engine 410, and is coupled to a database 412 and a media stream library database 414. The recognition server 404 may be configured to operate similar to the server 122 in FIG. 1, for example.

The request server 404 may be configured to instruct the client device to operate in a continuous identification mode, such that the client device continuously performs content identifications of content within a received data stream at the client device in the continuous identification mode (rather than or in addition to sending queries to the recognition server 402 to identify content). The request server 404 may be coupled to a database 416 that includes content patterns, and the request server 404 may access the database 416 to retrieve content patterns and send the content patterns to the client device.

In one example, the request server 404 may send the client device one or more content patterns, and an instruction to continuously perform content identifications of content in a data stream at the client device. The client device may responsively operate in a continuous mode. The request server 404 may send the instruction to the client device during times when the recognition server 402 is experiencing a high volume of content identification requests, and thus, the request server 402 performs load balancing by instructing some client devices to locally perform content identifications. Example times when a high volume of requests may be received include when an advertisement is being run on a television that includes a song during a time when a large audience is tuned to the television. In such instances, the request server 404 can plan ahead, and provide content patterns matching the song to be rendered during the advertisement to the client device and include an instruction for the client device to perform the content identification locally. The instruction may include an indication of when the client device should perform local content identifications, such as to instruct to do so at a future time and for a duration of time. In some examples, for promotions, content patterns can be provided to the client device to have a local cache of patterns (e.g., about 100 to 500 content patterns), and the instruction can indicate to the client device to perform content identifications locally for as long as the promotions run.

Content patterns to be provided to the client device can be selected by the request server 404 based on a number of criteria. For example, the request server 404 may receive information related to a user's profile, and may select content patterns to be provided to the client device that are correlated to the user's profile. Specially, a user may indicate a preference for a certain genre of music, artists, type of music, sources of music, etc., and the request server 404 may provide content patterns for media correlated to these preferences.

As another example, the request server 404 may receive information related to a location (past or current) of a client device, and may select content patterns to be provided to the client device that are associated with the location of the client device. Specifically, the request server 404 may receive information indicating that the client device is located at a concert, and may select content patterns associated with music of genre or the artist at the concert to be provided to the client device.

As another example, the request server 404 may receive information related to media content stored on the client device, and may select content patterns to be provided to the client device that are related to the media content stored on the client device. Content patterns may be related in many ways, such as, by artist, genre, type, year, tempo, etc.

As another example, the request server 404 may receive information related to previously identified media content by the client device, and may select content patterns to be provided to the client device that are related to content previously identified by the client device or the recognition server 402. In this example, the request server 404 may store a list of content identified by the client device or by the recognition server 402 so as to select and provide content patterns related to identified content.

As another example, the request server 404 may select content patterns to be provided to the client device based on information received by a third party. The third party may provide selections to the request server 404 so as to select the content patterns that are provided to the client device. In one example, a third party advertiser may select content patterns based on content to be included within future advertisements to be run within radio or television ads.

As another example, the request server 404 may select content patterns to be provided to the client device that are based on a statistical profile indicating a popularity of pieces of content pertaining to a history of content identifications. In this example, the request server 404 may maintain a list of media content identified by the recognition server 402, and may rank a popularity of media content based on a number of content identification requests for each media content. For media content that have received a number of content identification requests above a threshold (e.g., 1000 requests within a given time period), the request server 404 may select content patterns of those media content and provide the content patterns to the client device. In this manner, the client device will have a local copy of the content pattern and may perform the content identification locally.

In still further examples, the request server 404 may select content patterns to be provided to the client device that are based any combination of criteria, such as based on a location of the client device and selected content patterns received from a third party (e.g., a third party identifies a number of content patterns to be provided to client devices based on their location).

Generally, within some examples, the request server 404 selects content patterns to be provided to the client device based on a probability that the client device (or a user of the client device) will request a content identification of the selected content. For example, for new or popular songs that have been released, or for which the recognition server 402 has received a spike in content identification requests over the past day, the request server 404 may provide content patterns of those songs to the client device so that the client device can perform a local content identification without the need of communicating with the recognition server 402. This may offload traffic from the recognition server 402 as well as enable a content identification to be performed more quickly by performing the content identification locally on the client device.

Using example methods described herein, all content identification processing can be performed on the client device for a limited set of content. For example, for promotions, content patterns related to content of the promotions can be provided to the client device, and the client device may be configured to operate in a continuous recognition mode and be able to identify this limited set of content.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

Since many modifications, variations, and changes in detail can be made to the described example, it is intended that all matters in the preceding description and shown in the accompanying figures be interpreted as illustrative and not in a limiting sense.

What is claimed is:

1. A method for identifying content in a data stream, comprising:
    receiving at a client device one or more content patterns of content, wherein the one or more content patterns are selected from a group consisting of content patterns correlated to a user's profile, content patterns associated with a location of the client device, content patterns related to content previously identified by the client device or a server, content patterns related to media content stored on the client device, and content patterns selected based on a statistical profile indicating a popularity of pieces of content;
    receiving, at the client device, a continuous data stream collected from an ambient environment of the client device;
    at the client device, substantially continuously performing a content identification of content in the data stream collected from the ambient environment of the client device based on the one or more content patterns received and stored on the client device, wherein the content patterns include information to identify pieces of content;
    based on the content in the data stream collected from the ambient environment of the client device matching to any of the content patterns stored on the client device, the client device providing a notification indicating recognition of the content in the data stream collected from the ambient environment of the client device, wherein the recognition indicates an identity of the content; and
    based on receiving an instruction, the client device querying the server to determine an identity of content in the data stream.

2. The method of claim 1, further comprising:
    determining whether the continuous data stream collected from the ambient environment of the client device includes media content;
    based on the determination that the continuous data stream collected from the ambient environment of the client device includes media content, continuously performing the content identification of content in the data stream at the client device; and
    based on the determination that the continuous data stream collected from the ambient environment of the client device includes random ambient noise, the client device not continuously performing the content identification of content in the data stream at the client device.

3. The method of claim 2, further comprising:
    if content in the data stream includes media content and is not identified at the client device, the client device providing a notification; and
    receiving a user selection of the notification causing the client device to query the server to determine the identity of content in the data stream.

4. The method of claim 1, wherein continuously performing the content identification of content in the data stream comprises performing the content identification without user instruction.

5. The method of claim 1, further comprising:
    the client device receiving from the server an instruction to continuously perform the content identification of content in the data stream at the client device.

6. The method of claim 1, wherein the one or more content patterns are selected by a third party.

7. The method of claim 1, further comprising:
    the client device identifying content in the data stream; and
    based on the identified content, the client device displaying advertisements related to the identified content.

8. The method of claim 1, further comprising:
    the client device identifying content in the data stream; and
    based on the identified content, the client device displaying synchronized media related to the identified content.

9. The method of claim 1, further comprising:
    the client device identifying content in the data stream based on the one or more content patterns received and stored on the client device; and
    the client device querying the server to verify the identification.

10. The method of claim 1, wherein the content patterns stored on the client device include information associated with extracted features of a media file.

11. The method of claim 1, wherein the content patterns stored on the client device include a temporally mapped collection of features describing a media file.

12. The method of claim 1, further comprising:
upon receiving, at the client device, the continuous data stream collected from the ambient environment of the client device, the client device initiating the continuous performance of the content identification of the data stream without user input.

13. The method of claim 1, wherein substantially continuously performing a content identification of content in the data stream collected from an ambient environment of the client device based on the one or more content patterns received and stored on the client device comprises:
determining fingerprints of the data stream;
comparing the fingerprints of the data stream to the content patterns received and stored on the client device; and
identifying a given content pattern received and stored on the client device that has a largest number of relative locations of fingerprints matching relative locations of fingerprints of the data stream.

14. A non-transitory computer readable medium having stored therein instructions executable by a computing device to cause the computing device to perform functions of:
receiving at the computing device one or more content patterns of content, wherein the one or more content patterns are selected from a group consisting of content patterns correlated to a user's profile, content patterns associated with a location of the computing device, content patterns related to content previously identified by the computing device or a server, content patterns related to media content stored on the computing device, and content patterns selected based on a statistical profile indicating a popularity of pieces of content;
receiving, at the computing device, a continuous data stream collected from an ambient environment of the computing device;
at the computing device, continuously performing a content identification of content in the data stream collected from the ambient environment of the computing device based on the one or more content patterns received and stored on the computing device, wherein the content patterns include information to identify pieces of content;
based on the content in the data stream collected from the ambient environment of the computing device matching to any of the content patterns stored on the computing device, the computing device providing a notification indicating recognition of the content in the data stream collected from the ambient environment of the computing device, wherein the recognition indicates an identity of the content; and
based on receiving an instruction, the computing device querying the server to determine an identity of content in the data stream.

15. The non-transitory computer readable medium of claim 14, wherein the instructions are executable to further perform functions of:
determining whether the continuous data stream collected from the ambient environment of the computing device includes media content;
based on the determination that the continuous data stream collected from the ambient environment of the computing device includes media content, continuously performing the content identification of content in the data stream at the computing device; and
based on the determination that the continuous data stream collected from the ambient environment of the computing device includes random ambient noise, the computing device not continuously performing the content identification of content in the data stream at the computing device.

16. The non-transitory computer readable medium of claim 14, wherein the instructions are executable to further perform functions of:
the computing device identifying content in the data stream; and
based on the identified content, the computing device displaying advertisements related to the identified content.

17. A system for identifying content in a data stream, comprising:
a processor; and
data storage storing instructions executable by the processor to perform functions of:
receiving at a computing device one or more content patterns of content, wherein the one or more content patterns are selected from a group consisting of content patterns correlated to a user's profile, content patterns associated with a location of the computing device, content patterns related to content previously identified by the computing device or a server, content patterns related to media content stored on the computing device, and content patterns selected based on a statistical profile indicating a popularity of pieces of content;
receiving, at the computing device, a continuous data stream collected from an ambient environment of the computing device;
at the computing device, continuously performing a content identification of content in the data stream collected from the ambient environment of the computing device based on the one or more content patterns received and stored on the computing device, wherein the content patterns include information to identify pieces of content;
based on the content in the data stream collected from the ambient environment of the computing device matching to any of the content patterns stored on the computing device, the computing device providing a notification indicating recognition of the content in the data stream collected from the ambient environment of the computing device, wherein the recognition indicates an identity of the content; and
based on receiving an instruction, the computing device querying the server to determine an identity of content in the data stream.

18. The system of claim 17, wherein the instructions are executable to further perform functions of:
determining whether the continuous data stream collected from the ambient environment of the computing device includes media content;
based on the determination that the continuous data stream collected from the ambient environment of the computing device includes media content, continuously performing the content identification of content in the data stream at the computing device; and
based on the determination that the continuous data stream collected from the ambient environment of the computing device includes random ambient noise, the computing device not continuously performing the content identification of content in the data stream at the computing device.

19. The system of claim 17, wherein the instructions are executable to further perform functions of:
   the computing device identifying content in the data stream; and
   based on the identified content, the computing device displaying advertisements related to the identified content.

* * * * *